United States Patent Office 3,687,689
Patented Aug. 29, 1972

3,687,689
METHOD OF PREPARING FRESH PORK SAUSAGE HAVING IMPROVED COLOR
Everett V. Podebradsky, Madison, Wis., assignor to Oscar Mayer & Company, Inc., Chicago, Ill.
No Drawing. Filed Mar. 30, 1970, Ser. No. 23,977
Int. Cl. A22c 11/00
U.S. Cl. 99—109      2 Claims

ABSTRACT OF THE DISCLOSURE

Pork sausage is made from pre-rigor meat. Meat from freshly killed hogs is ground coarsely and mixed with salt and spices while still body-warm. The meat is cooled sufficiently to result in good particle definition when reground through a smaller plate. After regrinding, the pork sausage mixture is stuffed into air permeable casings, linked and the links are packaged.

---

The present invention relates to a process of preparing sausages containing pre-rigor meat products from the carcass of a hog or the like, which sausages have improved keeping qualities and color retention.

U.S. Pat. 3,124,462 discloses a method of manufacturing sausages containing ground processed meat products in which pre-rigor meat is ground at elevated temperature, e.g., above 80° F., and the resulting mixture, with appropriate seasoning, salt, etc. added thereto, is stuffed into casings which are impermeable to air. Tests made during our evaluation of pork sausage manufactured in this manner resulted in a product having a very smeared, scaly appearance of the links.

It is an object of this invention to provide a method of manufacture of fresh pork sausages, which sausages have an improved appearance, improved color stability, and improved keeping qualities.

I have discovered that using pre-rigor meat, and the method comprising coarse grinding the meat at temperatures above 80° F., e.g., through a ½ inch plate, mixing the resulting material with salt, and other desired additives, cooling the resulting admixture to a temperature between 26° F. and 50° F., chopping or regrinding the admixture through a smaller size plate, e.g., 3/16 inch, and finally stuffing, under controlled pressure conditions, the admixture into high oxygen through-put casings such as sheep casings or edible collagen casings, results in a pork sausage with superior color intensity and keeping time. The invention will be described with the aid of the numbered examples presented below in which all parts are in parts by weight, all temperatures are expressed in degrees Fahrenheit and all percentages are expressed in percent by weight.

EXAMPLE I

Pre-rigor meat was obtained from large hogs on the kill floor. Portions of ham, including ham fat and skin, and portions of belly including the mammary gland were removed from several carcasses. This method was chosen in order to provide a blended source of meat rather than having all of the meat for the test from a single carcass. Ham trim was included to provide a desired ratio of lean to fat. Skin, glands, and mammary glands were removed from the trim while the meat was still above 90° F. The hot pre-rigor trim was ground through a ½ inch plate, and spiced (with anti-oxidant salt) and three percent water was added with the hot-ground trim immediately after grinding. The mixed material was placed on trays and chilled to approximately 40° F. in a −20° freezer. This took approximately one-half hour, although in other similar tests the time varied from one-half hour to two hours depending upon the size of the test and the depth of material in the trays. The chilled meat was then ground through a 3/16 inch plate. The ground pork sausage was stuffed with a hydraulic stuffer, with maximum pressure at 120 p.s.i.g., into sheep casings in one series of tests, and into Coria casings in a second series of tests in which all conditions were identical except for the make-up of the casings. Coria casings are edible collagen casings. Both of these casings have high oxygen permeability. The stuffed casings were hand twisted and cut into links. The links were placed in one-half pound commercial pork sausage display cartons. In each series of tests a portion of the product was placed (a) in a −20° F. freezer and another portion was placed (b) in a lighted showcase. Control pork sausage made from post rigor trim from production was included with each test.

Color fading rate was judged at several day intervals and recorded on a 4–1 scale wherein 4 is fresh "bloomed" pork sausage and 1 is gray. A rating of 1.5 is considered unsaleable. Also, photographs were taken at several day intervals to record color degradation. Evaluation of color was also subsequently made for samples which were frozen before placing in a lighted showcase. Both the product, produced in accordance with this invention as set forth in this example, and control product which was used for comparison with the products of this invention, were submitted for chemical analysis. The results of the observations of the storage period are set forth in Table 1, herein, and the results of the chemical tests are set forth herein in Table 2.

TABLE I
Color Rating in Lighted Showcase [1]

| Pork sausage identification | Days in showcase | | | | | | | |
|---|---|---|---|---|---|---|---|---|
| | 2 | 4 | 6 | 8 | 10 | 12 | 14 | 16 |
| Control A | 3.5 | 2 | 1.25 | 1 | 1 | 1 | 1 | 1 |
| Example I (sheep casing) | 3.5 | 3.25 | 2.75 | 2.5 | 2.25 | 1.25 | 1.25 | 1 |
| Example I (coria casing) | 3.5 | 3.25 | 3 | 2.75 | 2.5 | 2 | 1.5 | 1.25 |
| Example I, coria casing—frozen before showcase | 3.5 | 3.25 | 3 | 2.75 | 2.5 | 1.5 | 1.25 | 1+ |

[1] 4=Bright red, 1=Gray, 1.5 is considered unsaleable.

TABLE II

| | Control A—Pork sausage, 15 samples | | Example I—Pre-rigor test Pork sausages, 6 samples | |
|---|---|---|---|---|
| | Avg. value | Range | Avg. value | Range |
| Moisture, percent | 38.7 | 35.3–42.8 | 47.8 | 45.8–50.3 |
| Protein, percent | 10.3 | 9.3–11.8 | 12.2 | 11.3–13.2 |
| Fat, percent | 48.3 | 43.9–52.9 | 37.4 | 34.0–39.7 |
| NaCl, percent | 1.9 | 1.6–2.2 | 1.9 | 1.8–2.1 |
| TBA ($10^{-8}$ moles Malon) | 1.9 | 1.4–2.3 | 1.3 | .9–2.1 |
| pH | 6.1 | 5.6–6.4 | 6.3 | 5.6–6.6 |
| Heme (p.p.m.) | 47.8 | 30.6–62.6 | 54.0 | 37.4–70.7 |

In Tables 1 and 2, Control A refers to product being commercially produced by the assignee at the time of the test. It will be appreciated from a consideration of Table 1 that the color life, i.e., the color life in a lighted showcase, obtained with pre-rigor pork sausage produced in accordance with Example 1 using Coria casings was about two weeks, and the same sausage frozen before placing in a showcase had a color life of ten to thirteen days. It is noted that the brightest color was obtained in the sausage in Coria casings which had not been frozen. Control pork sausage made in production had a color life in the showcase of four to seven days.

EXAMPLE II

Two tests were conducted to determine the effect of holding the pork sausage at 32° F. following the initial grinding and mixing. The procedure of Example I was repeated in a series of tests except that individual test batches were held from one to four days after the initial grinding and mixing before final grinding and stuffing. It was observed that as the holding time increased a reduced color intensity and more rapid fading under light was observed.

EXAMPLE III

A test was run to determine the effect of freezing pre-rigor meat before adding spice and freezing pre-rigor meat after adding spice. In both instances the color intensity was less and the color faded more rapidly than pre-rigor sausage made without freezing or freezing the pork sausage after stuffing.

EXAMPLE IV

The procedure of Example I was repeated in another series of tests except that butcher size hogs were used in some tests, and large hogs were used in other tests. This was to determine whether pork sausage made with pre-rigor meat from butcher size hogs in the procedure of this invention was comparable with pre-rigor pork sausage made from large hogs. There was very little difference noticeable except for a slightly lighter color for the pork sausage made from butcher size hogs.

In each of the above tests in which the product of this invention was compared to the products made by heretofore conventional procedures, it was observed that samples produced in accordance with this invention, at the end of the color-fading test, did not have the off odors found in control samples.

Generally speaking, pressures employed during the stuffing step in the sequence of steps of this invention must be less than 120 p.s.i.g. to prevent smearing of the fat.

I claim:
1. The method of preparing fresh pork sausage having improved color life comprising the steps:
   obtaining trimmings from a freshly slaughtered carcass while still hot;
   coarse grinding said carcass trimmings while still at a temperature above 80° F.;
   mixing salt and spices with said trimmings immediately after said grinding;
   immediately cooling the coarse ground trimmings to a temperature between 26° F. and 50° F. without freezing said trimmings;
   chopping or regrinding the cooled mixture to smaller size than that produced in said coarse grinding; and
   stuffing the resulting trimmings into air permeable casings, said stuffing step taking place at pressures less than 120 pounds per square inch.
2. A method of preparing fresh pork sausages comprising the steps:
   (1) coarse grinding trimmings from a freshly slaughtered carcass while the trimmings are in pre-rigor condition and while still above approximately 80° F.;
   (2) immediately mixing with resulting coarse-ground trimmings desired additives;
   (3) immediately cooling the resulting admixture to a temperature between 26° F. and 50° F. without freezing said admixture;
   (4) chopping or regrinding the cooled admixture through openings which are slightly smaller than the initial openings;
   (5) stuffing the reground mixture into casings having high oxygen through-put, said stuffing step taking place at pressures less than 120 pounds per square inch.

References Cited
UNITED STATES PATENTS

| | | | |
|---|---|---|---|
| 2,874,060 | 2/1959 | Turner et al. | 99—194 |
| 3,124,462 | 3/1964 | Vogel et al. | 99—109 |

HYMAN LORD, Primary Examiner

U.S. Cl. X.R.

99—108